United States Patent
Kant

(10) Patent No.: US 9,363,744 B2
(45) Date of Patent: Jun. 7, 2016

(54) METHOD AND SYSTEM FOR SCALABLE AND MANAGEABLE NON-ACCESS STRATUM (NAS) NODE SELECTION FUNCTION FOR EVOLVED PACKET SYSTEMS

(71) Applicant: Brocade Communications Systems, Inc., San Jose, CA (US)

(72) Inventor: Nishi Kant, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/856,248

(22) Filed: Sep. 16, 2015

(65) Prior Publication Data

US 2016/0050620 A1    Feb. 18, 2016

Related U.S. Application Data

(63) Continuation of application No. 14/067,272, filed on Oct. 30, 2013, now Pat. No. 9,204,361.

(51) Int. Cl.
| | | |
|---|---|---|
| *H04W 48/18* | (2009.01) | |
| *H04W 8/06* | (2009.01) | |
| *H04W 40/12* | (2009.01) | |
| *H04W 28/08* | (2009.01) | |
| *H04W 40/20* | (2009.01) | |
| *H04L 29/06* | (2006.01) | |
| *H04L 29/12* | (2006.01) | |
| *H04L 29/08* | (2006.01) | |
| *H04W 68/12* | (2009.01) | |
| *H04W 60/00* | (2009.01) | |
| *H04W 68/02* | (2009.01) | |

(52) U.S. Cl.
CPC ......... *H04W 48/18* (2013.01); *H04L 29/08144* (2013.01); *H04L 29/08162* (2013.01); *H04L 61/2007* (2013.01); *H04L 69/22* (2013.01); *H04W 8/065* (2013.01); *H04W 28/08* (2013.01); *H04W 40/12* (2013.01); *H04W 40/20* (2013.01); *H04W 60/00* (2013.01); *H04W 68/02* (2013.01); *H04W 68/12* (2013.01)

(58) Field of Classification Search
None
See application file for complete search history.

(56) References Cited

U.S. PATENT DOCUMENTS

| | | | |
|---|---|---|---|
| 2010/0020186 A1 | 1/2010 | Matsui | |
| 2010/0080186 A1* | 4/2010 | Guo | H04W 28/08 370/329 |
| 2010/0271949 A1 | 10/2010 | Yoon et al. | |
| 2011/0122779 A1* | 5/2011 | Meirosu | H04W 28/08 370/252 |

(Continued)

*Primary Examiner* — Christopher Crutchfield
(74) *Attorney, Agent, or Firm* — Blank Rome, LLP

(57) ABSTRACT

A network element having a Non-Access Stratum (NAS) Node Selection Function for discriminating information in order to determine which core network node a signaling message should be sent comprising: a network interface unit configured to interact with a packet network system; a processor with a memory associated with the network interface unit and adapted to: receive the signaling message from an eNB at a selection function; extract header information from Stream Control Transport Protocol (SCTP) of the signaling message; communicate with a database having a persistent application map to determine if there is an association between the header information and a core network entity; if there is an association, forward the signaling message to a selected core network entity; and determine at the selected core network entity which one of a plurality of core network nodes within a core network pool to route the message based on availability of the plurality of core network nodes.

20 Claims, 7 Drawing Sheets

(56) References Cited

U.S. PATENT DOCUMENTS

| | | |
|---|---|---|
| 2012/0033551 A1 | 2/2012 | Liao |
| 2012/0264455 A1 | 10/2012 | Yasuoka |
| 2013/0100813 A1* | 4/2013 | Velamati ............... H04W 8/12 |
| | | 370/236 |

* cited by examiner

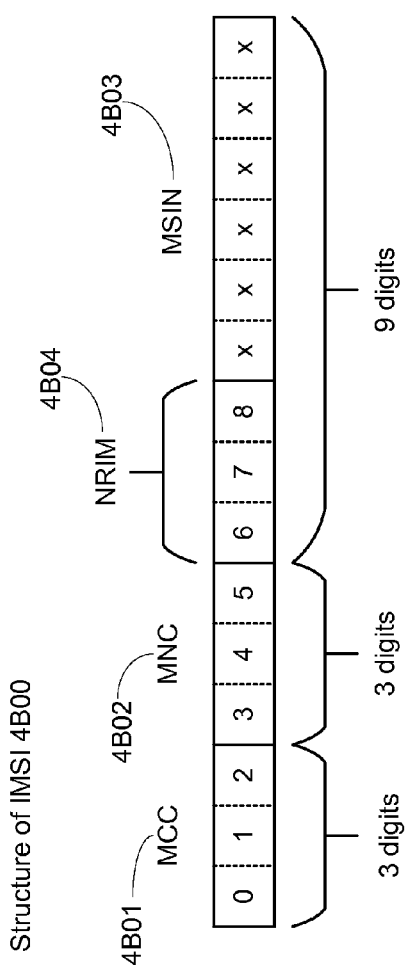
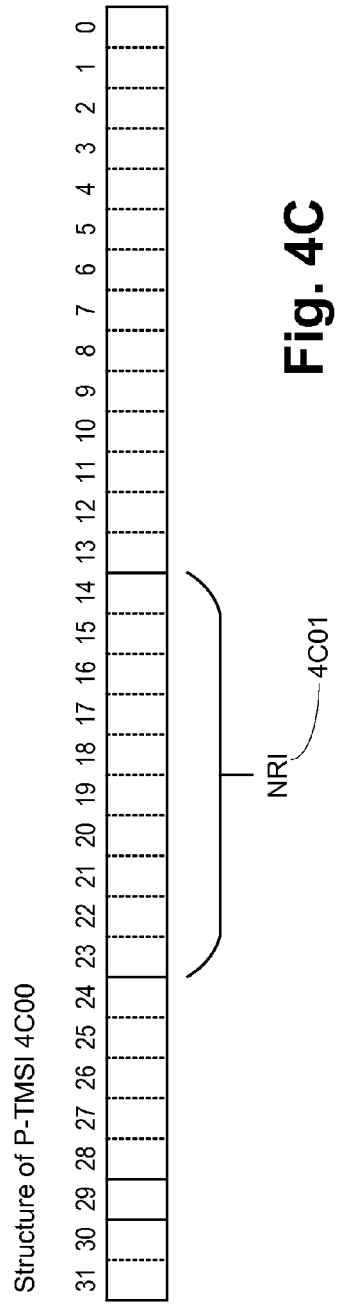

METHOD AND SYSTEM FOR SCALABLE AND MANAGEABLE NON-ACCESS STRATUM (NAS) NODE SELECTION FUNCTION FOR EVOLVED PACKET SYSTEMS

CROSS REFERENCES TO RELATED APPLICATIONS

This application is a continuation of U.S. application Ser. No. 14/067,272, filed Oct. 30, 2013, entitled "Method and System for Scalable And Manageable Non-Access Stratum (NAS) Node Selection Function for Evolved Packet Systems," which is hereby incorporated by reference as though fully set forth herein.

FIELD OF THE INVENTION

The present invention relates generally to general packet radio service (GPRS) networks and its evolution including but not limited to Universal Mobile Telecommunication System (UMTS) and Long Term Evolution (LTE). More particularly, in the embodiments described herein are methods, systems, and computer readable media for providing a non-access stratum (NAS) node selection function in a core network which exploits its location for availability monitoring and availability-based load balancing.

BACKGROUND

In the first, second and early releases of third generation of mobile communications networks (i.e., global system for mobile communications (GSM), GPRS, code division multiple access (CDMA) 1x, UMTS, the GSM/GPRS/CDMA base station controller (BSC) and UMTS radio (radio network controller (RNC)) were restricted to connect to a single core network (CN) node. This strict hierarchy resulted not only in inefficiency of CN node utilization but service providers were forced to add more CN nodes in areas with more BSCs/RNCs even if the adjoining area CN node had excess capacity in terms of the number of BSCs/RNCs it could connect to.

Third Generation Partnership Project (3GPP) TS 23.236 defines technical requirements for Iu-flex, a mechanism whereby radio access nodes, such as RNCs, can select any core network node, such as a serving GPRS support node (SGSN) or mobile switching center (MSC) from a pool of CN nodes that serves a specific geographic area. The group of CN nodes that serve a pool area is referred to as the MSC pool or the SGSN pool. Allowing access nodes to select from multiple CN nodes within a pool area increases the efficiency of utilization of CN node resources. A TS 23.236A pool-area is an area within which a mobile station (MS) may roam without a need to change the serving CN node. A pool area is served by one or more CN nodes in parallel. The complete service area of a radio access network (RAN) node belongs to the same one or more pool-area(s).

The Network Resource Identifier (NRI) 4C01 identifies uniquely an individual CN node out of all CN nodes, which serve in parallel a pool-area. An NRI identifies uniquely a CN node within a RAN node. The NRI is carried as part of the temporary identity packet temporary mobile subscriber identity (P-TMSI), which is assigned by the serving CN node to the mobile subscriber (MS). Each CN node which supports the "Intra Domain Connection of RAN Nodes to Multiple CN Nodes" is configured with its specific one or more NRI(s). The P-TMSI allocation mechanism in the CN node generates P-TMSIs which contain a configured NRI in the relevant bit positions. The NRI has a flexible length between 0 and 10 bits (wherein the 0 bits means the NRI is not used and the feature is not applied). The RAN uses specific bits in the P-TMSI or international mobile subscriber identities (IMSIs) to determine the NRI which is relevant to identify the CN node. The functionality to select the core network node is called NAS Node Selection Function (NNSF). NAS stands for Non-Access Stratum since the interaction with core network is not at the radio access level.

Clearly the NAS Node Selection Function is a good candidate for balancing the load between the available CN nodes. However, being located in the RAN node, the NNSF process may not have visibility in respective loading of the CN nodes. Since the load-balancing process is left as implementation specific it hard to expect an efficient balancing when RAN includes multiple vendors or when the deployment includes small and large cells.

The concept of selecting a CN node has been extended to include machine type communication (M2M). Many M2M devices have low priority in accessing the network and NNSF can be used to select a CN node that is specifically designated/designed to handle Machine Type Communications.

It is clear from the foregoing that locating NNSF in the RAN node has significant implications for an RNC or evolved/enhanced node B (eNB), since it needs to be upgraded/augmented with NNSF, it has to be configured with NRI to CN node mapping and with a load balancing process that can collect the right load information. FIG. 1 illustrates an Iu-flex and S1-flex implementation.

There is a related concept of the network sharing where the RAN node could select a CN node from different operators. 3GPP TS 23.251 defines network sharing and multi-operator core networks (MOCN) operation which creates a scenario where a single RNC needs to connect to more than one CN node, in this scenario the CN nodes may belong to different service providers. FIG. 2 illustrates an example of MOCN operation. The mechanisms of MOCN have been extended to LTE Evolved Packet System. For the MOCN functionality to work the CN is identified by the public land mobile network identity (PLMN-id) (mobile country code (MCC)+mobile network code (MNC)). The MCC is the mobile country code and the MNC is the mobile network code that identifies an operator within the country. The IMSI has three parts MCC, MNC and a mobile subscriber identity (MSIN)). The MSIN part in conjunction with MCC+MNC uniquely identifies a subscriber anywhere in the world. Thus in MOCN operation, the RNC/eNB looks at the MNC part or the IMSI and selects the CN nodes for that operator. Once the subscriber is mapped in corresponding operators CN node, the RNC/eNB nodes are required to maintain this association so that subsequent signaling goes to the right CN node. The associations between the RNC/eNB and CN nodes are Iu and S1 both of which involve several layers of protocols. As described in the prior art (e.g., Ericsson Patent application WO 2011/115543), the selection criteria can be extended to higher bits of MSIN and that application also indicates how the MOCN mechanism can be extended to accommodate Machine Type Communication within a single operator.

Just as in the case of Iu-Flex/S1-Flex, the location of intelligence in a Radio Access Node regarding the right CN node has it challenges. Not only do all RAN nodes need to be configured with multiple connections and configurations, they have to maintain association for each active user equipment (UE) with the selected CN node since the selection criteria may not be present in the subsequent signaling. Moreover, for many legacy UEs, RAN nodes may never have enough information to select the right CN node. FIG. 3 illustrates this point where a legacy UE attempts to connect and is redirected sequentially by the first CN node to the next and so on until the right node is found.

3GPP TR 23.823 describes an architecture where the NAS node selection function is located above the RNC. However, like TS 23.236, TS 23.823 indicates that the load-balancing algorithm is implementation specific. In addition, TR 23.823 indicates that the NNSF can be located in a stand-alone intermediary node or co-located with another node, but does not specify the node type with which the NNSF can be co-located.

While Iu-flex "pooling" and MOCN features are being used, their deployment has been limited due to these reasons. These issues become an order of magnitude bigger in LTE where there are many more eNBs. Just to understand the scale, in 3G networks, a couple of thousand nodeBs connect to an RNC and tens of RNCs share an Iu-flex pool. In LTE there are tens of thousands of eNBs connecting to a few mobility management entities (MMEs) in a pool.

Clearly, configuring such a large number of nodes with an MNC or NNSF process creates a challenge.

SUMMARY

Aspects of the disclosure include a network element having a Non-Access Stratum (NAS) Node Selection Function for discriminating information in order to determine which core network node a signaling message should be sent comprising: a network interface unit configured to interact with a packet network system; a processor with a memory associated with the network interface unit and adapted to: receive the signaling message from an eNB at a selection function; extract header information from Stream Control Transport Protocol (SCTP) of the signaling message; communicate with a database having a persistent application map to determine if there is an association between the header information and a core network entity; if there is an association, forward the signaling message to a selected core network entity; and determine at the selected core network entity which one of a plurality of core network nodes within a core network pool to route the message based on availability of the plurality of core network nodes.

Another aspect of the disclosure is a network element having a Non-Access Stratum (NAS) Node Selection Function for discriminating information in order to determine which core network nodes a signaling messages should be sent: a network interface unit configured to interact with a packet network system; a processor with a memory associated with the network interface unit and adapted to: receive the signaling messages from a plurality of eNBs at a plurality of selection functions; in parallel, extract header information from Stream Control Transport Protocol (SCTP) of the signaling messages; communicate with a database having a persistent application map to determine if there is an association between the header information and core network entities; if associations are found, forward the messages to the selected core network entities; and determine at the selected core network entities which of a plurality of core network nodes within a core network pool to route the messages based on a load balance of the plurality of core network nodes.

Another aspect of the disclosure is a method performed with at least one network element having an access network unit interface, a processor and memory, the at least one network element configured to discriminate information in order to determine which core network node a signaling message should be sent comprising: receiving a message from an eNB at a selection function located in the at least one network element; extracting header information from Stream Control Transport Protocol (SCTP) of the signaling message; communicating with a database having a persistent application map to determine if there is an association between the header information and a core network entity; if there is an association, forwarding the message to a selected core network entity; and determining at the selected network connection entity which one of a plurality of core network nodes within a core network pool to route the signaling message based on availability of the plurality of core network nodes.

BRIEF DESCRIPTION OF THE DRAWINGS

The present invention is illustrated by way of example and not limitation in the figures of the accompanying drawings in which like references indicate similar elements.

FIG. 4B is a diagram of illustrating an IMSI.

FIG. 4C is a diagram illustrating a P-TMSI.

DETAILED DESCRIPTION

This disclosure illustrates methods, systems, and computer readable media for providing an NAS node selection function in the core network and exploiting its location in the core network for availability monitoring and availability-based load balancing. The embodiments described herein describe a network based NNSF, that provides scalable and backwards compatible solution without impacting the Radio Access Nodes.

Figure 4A:
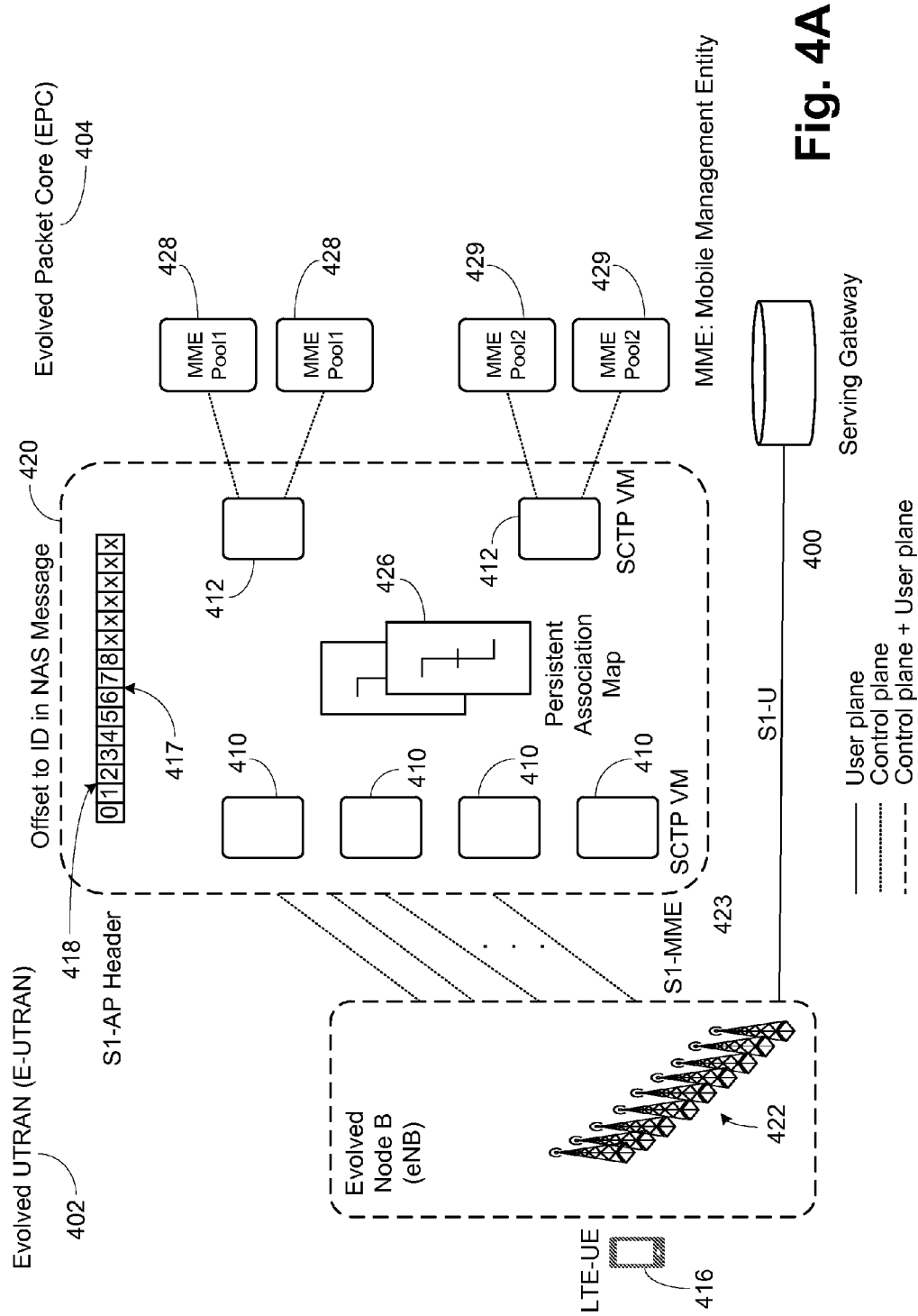
FIG. 4A is a block diagram illustrating stream control transmission protocol (SCTP) based network node selection function in a core network.

The embodiments described in this disclosure apply to circuit switched (CS) and packet switched (PS) domain operations but for simplicity the mechanism described herein focuses on the PS domain. Also, the embodiments disclosed herein use the fact that a transport protocol for Iu and S1 is based on SCTP (Stream Control Transport Protocol). This disclosure is described with the help of S1 interface but to the skilled in art it would clear that the embodiments apply to Iu interface as well. According to one aspect of this disclosure as illustrated in FIG. 4A, the RAN nodes simply associate their SCTP with a network based SCTP endpoint 400 (or network element) that is located logically between an Evolved Universal Terrestrial Radio Access Network (E-UTRAN) 402 and Evolved Packet Core (EPC) 404 and preferably located at the core network. The SCTP endpoint 400 is capable of scaling a large number of SCTP connections with a single logical address. The Linux Virtual Server (LVS) is an example of such SCTP scaling. The EPC shows MMEs in a first pool 428 and second pool 429 for exemplary purposes but may include a much larger number of pools. The SCTP end point 400 illustrated in FIG. 4A employs multiple SCTP protocol processing entities but to the RAN node it may appear as a single node. Each SCTP processing entity could be a virtual machine (VM) or logic (410, 412) in a virtualized environment 400. This SCTP endpoint or Virtualized SCTP NNSF (VSN) 400 uses protocol processing entities 410, 412 in a load sharing mode. Each protocol processing entity 410, 412 is capable of extracting the SCTP payload and is capable of receiving SCTP payload from other applications. Each VSN inspects the NAS within SCTP for discriminating information in order to determine which core network node a message should be sent.

The method disclosed herein includes receiving initial layer 3 messages 417 from radio access nodes 422 in response to UE 416 activity. Another aspect of NNSF as per this disclosure includes the logic to examine the S1 Application Protocol (S1-AP) header information 418 to determine which CN node the incoming message 417 from a RAN node should be sent to. In case the S1 header information 418 does not have adequate information (which is the case in a first message from the UE 416), the NNSF logic of this embodiment proceeds to examine the NAS message 420 contained in the S1-AP message 417. The identity information in the NAS message 420 contains the information as to which CN node the incoming signaling message should be sent. The VSN 400 also includes the ability to associate information across different protocol layers in order to route messages efficiently just by examining the headers after the correlation between the Si header and initial message has been established.

As shown in FIG. 4A, all eNBs 422 in the EUTRAN 402 can be simply configured to setup their S1-MME association 423 to VSN 400, i.e., a single internet protocol (IP) address or dual multi-homed IP addresses for the VSN 400. The VSN 400 parallelizes the processing of SCTP streams across multiple ingress SCTP instances running on ingress VMs or logic (also known as a "selection function") 410. Each ingress VM 410 extracts the SCTP data and then parses it shallowly to examine a portion of the S1-AP header information 418. VM 410 then consults a persistent application map 426 to find existing associations. If found, VM 410 forwards the complete S1-AP message to the mapped egress SCTP VM or logic (also known as a "core network entity" or after selection a "selected core network entity" herein) 412. The egress SCTP VM 412 maintains the outgoing SCTP associations to MMEs 428. The egress SCTP VM 412 can load balance across different MMEs (428 or 429) in the same pool.

Figure 1:
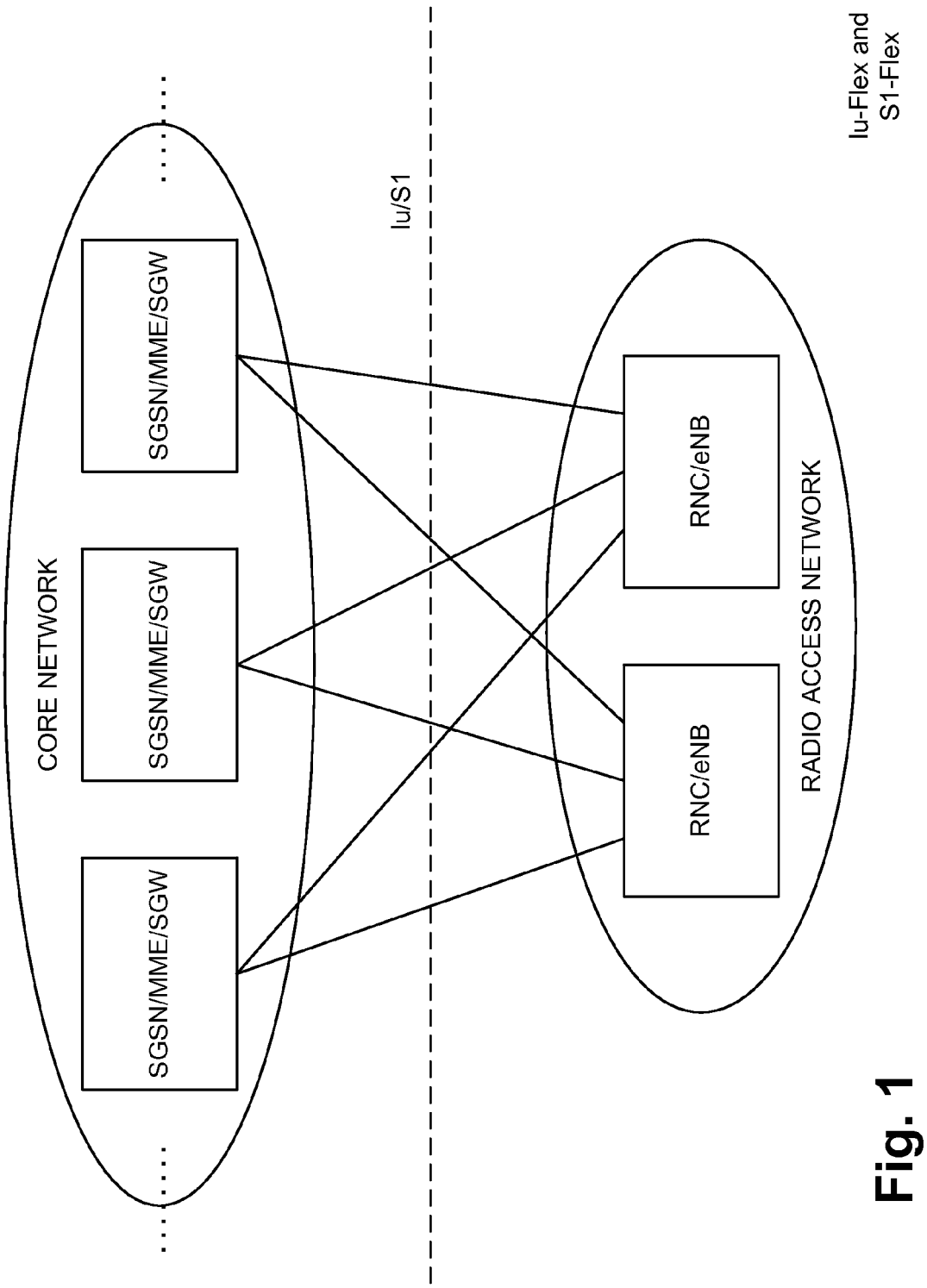
FIG. 1 is a diagram showing an implementation of Iu-Flex and S1-Flex.
Figure 2:
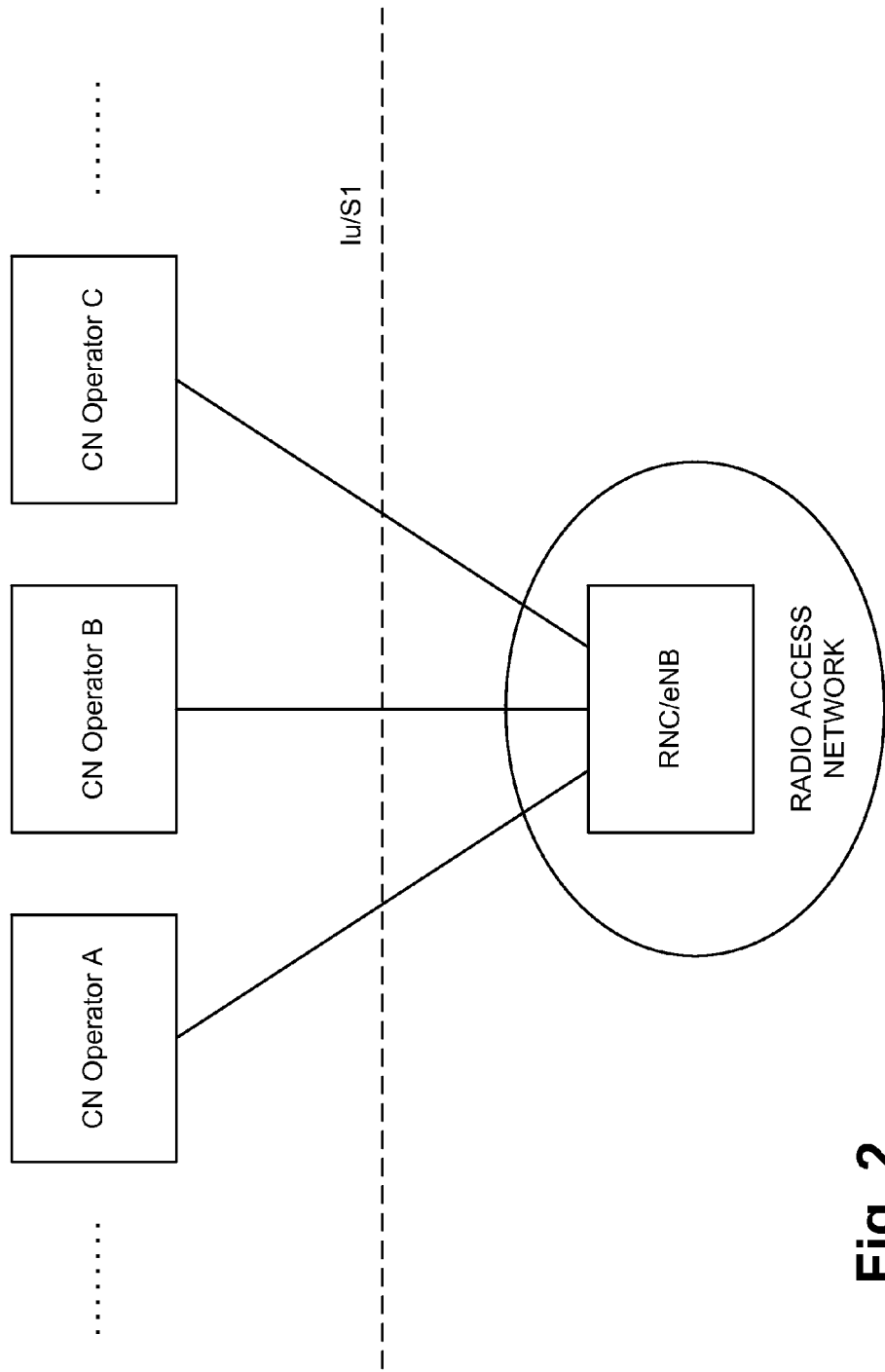
FIG. 2 is a diagram showing multi-operator core network (MOCN) implementation.
Figure 3:
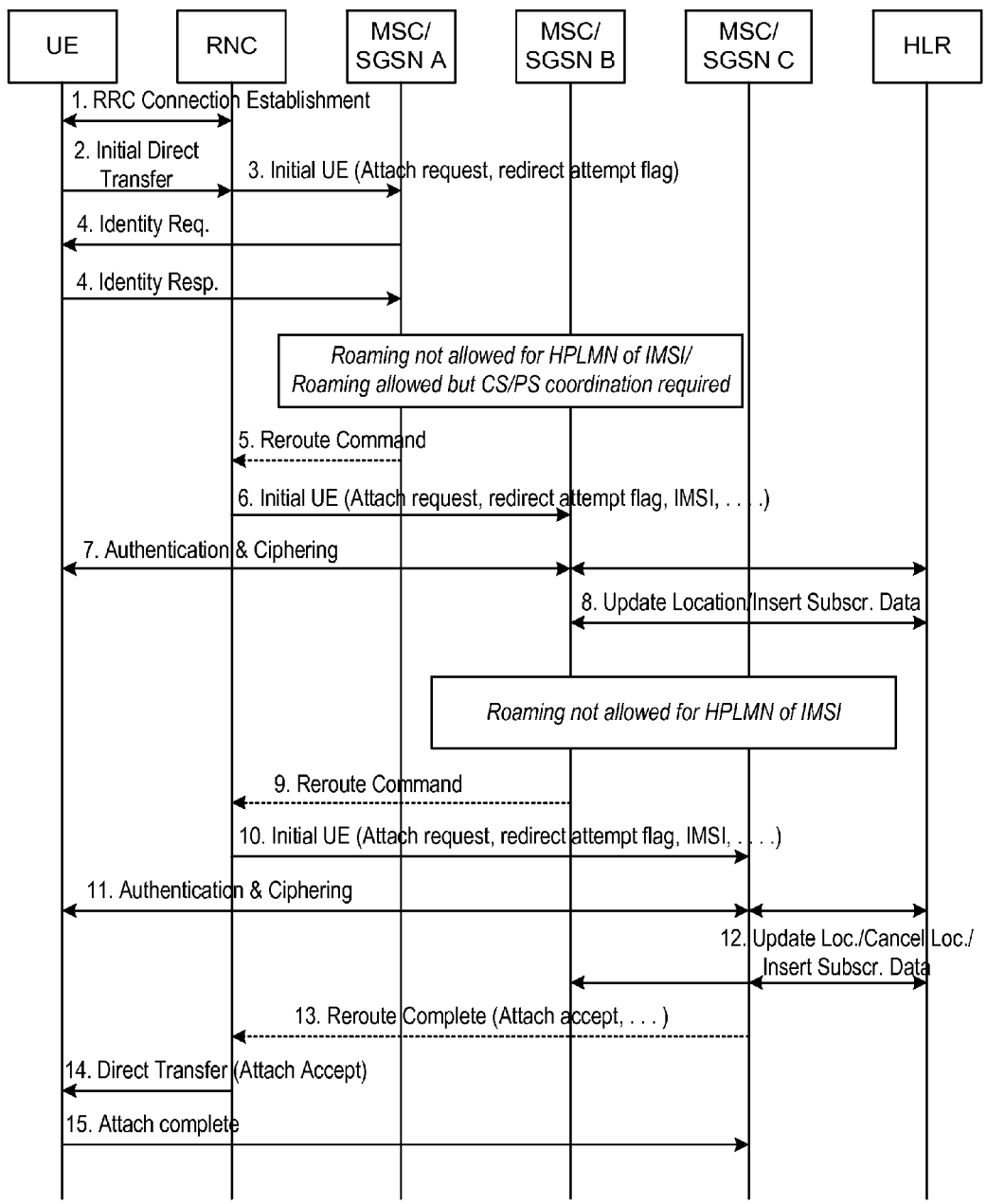
FIG. 3 is a diagram illustrating the complexity of MOC where a legacy UE attempts to connect and is redirected sequentially by the first CN node to the next and so on till the right node is found and defined networking applied to the mobile network.

In case the ingress VM 410 cannot find the sufficient data in S1-AP header 418, it continues to parse the NAS message. It is important to note that the NAS message typically only has to be partially parsed in order to get to the required identity information. It uses the identity information in the NAS message and the configured information in the VSN 400 to decide the correct MME pool 428, 429. If necessary the VSN 400 can add the indication on behalf of the UE 416 so that the node selection has already occurred and the MME 428, 429 does not treat a legacy UE with redirects as show in FIG. 3. In other words, even the legacy UE would appear to support MOCN and therefore the CN node will not need to use redirect processes. MOCN capable UEs select the correct CN operator based on broadcast information. A legacy UE cannot do that so it sends its initial message to a default operator. The RAN will add a flag to indicate the CN operator has not been selected yet. The VSN 400 function can look at configured information and send the message to the right egress node. Or in case VSN 400 does not have mapping information (e.g., a roaming user, MCC, MNC or NRI unknown to the VSN 400), it can send to all egress entities. VSN 400 can remove the reroute flag (indication) while doing so. The egress entity that completes the transaction would be added in the VSN map as a dynamic entry.

The VSN 400 then puts this relationship in the persistent application map 426. When the target MME (428 or 429) responds to the message, the egress SCTP VM 412 consults the persistent map 426 and completes the two way association. From this point onwards the SI-header information should be enough to map ingress VMs 410 and egress VMs 412.

Figure 4D:
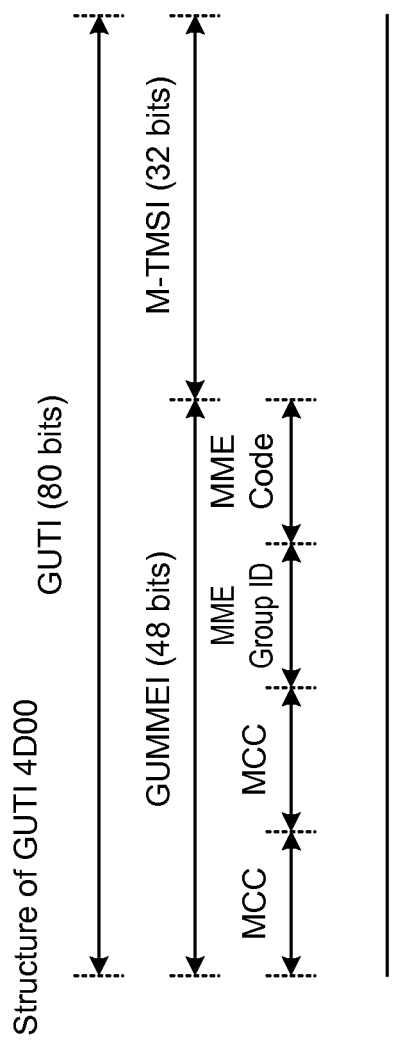
FIG. 4D is a diagram illustrating a Globally Unique Temporary UE Identity (GUTI) having the Global Unique MME Identifier (GUMMEI).

The egress VMs 412 monitor the load of each MME (428 or 429) in the pool. Such a monitoring process can simply be implemented in the egress VM 412 by counting the NAS messages targeted to a given MME node in certain (or predetermined) amount of time. Egress VM 412 can then use such monitoring capability in conjunction with any configured MME 428, 429 capacity to balance the load across the MME nodes in a pool. The egress VM 412 is also aware of connectivity status and congestion in each of the links to the MME 428. The egress VM 412 can use such information in its load balancing logic. The egress VMs 412 can also employ configured information to segregate application specific communications such as Machine Type Communications, voice type communications and video type communications and send each of the associated signaling to a different, particularized MME. FIG. 4B illustrates the IMSI wherein the MNC indicates the type of application specific communications is carried by the message. When the MME 428, 429 responds to the UE activity or initiates one from the network side, it reaches the egress VM 412. The egress VM 412 uses the persistent map 426 or logic as to which ingress VM 410 it should forward the message to. FIG. 4B illustrates IMSI 4BOO, FIG. 4C illustrates the P-TMSI 4COO. FIG. 4D illustrates Globally Unique Temporary UE Identity (GUTI) 4DOO having the Global Unique MME Identifier (GUMMEI). Substructures in these identities such as NRI or GUMMEI are used as discriminators for the selection logic.

Therefore the method described herein includes receiving initial layer 3 messages from radio access nodes 422 in response to mobile station activity. The method further includes performing various steps at a NAS node selection function which may be integrated with or separate from the MME. The method includes adding an indication so that even a legacy UE appears as capable of performing CN selection for MOCN, thereby eliminating the need for CN nodes to using redirects. The method includes monitoring load and availability for each of many CN nodes. The method further includes storing load and link congestion levels for each of the CN nodes. The method further includes, in response to the messages, assigning mobile stations to the CN nodes in a load-sharing manner using the stored indications of availabilities.

Figure 5:
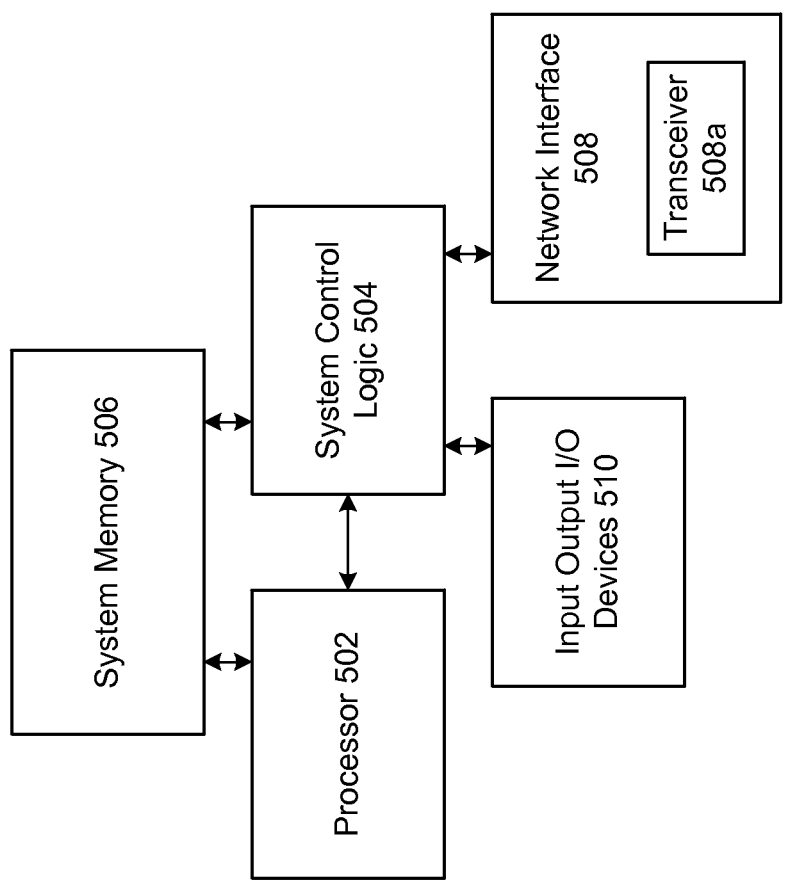
FIG. 5 is a block diagram of an embodiment of the network element described herein.

The VSN 400 as described herein and further illustrated in FIG. 5 preferably is located at a network element in the core network (including being integrate with an MME) or the functions of the VSN 400 described herein may be divided among a plurality of network elements in the core network. However, in other embodiments the VSN 400 is not located physically at the core network but is logically located between the core network and the eNBs. The VMs 410, 412 may be located at the same network element as the VSN 400 or the VMs 410, 412 may be located (together or separately) at a plurality of network elements. VSN 400, ingress VM 410, and egress VM 412 may each have a controller, logic, memory, interface, and input/output which may be implemented using any suitable hardware, software and/or firmware configured as shown in FIG. 5. FIG. 5 comprises one or more system control logic 504 coupled with at least one or all of the processor(s) 502, system memory 506, a network interface 508 (including a transceiver 508a), and input/output (1/0) devices 510. The processor(s) 502 may include one or more single-core or multi-core processors. The processor(s) 502 may include any combination of general-purpose processors and dedicated processors (e.g., graphics processors, application processors, baseband processors, etc.). System control logic 504 for one embodiment may include any suitable interface controllers to provide for any suitable interface to at least one of the processor(s) 502 and/or to any suitable device or component in a packet network in communication with system control logic 504. System control logic 504 for one embodiment may include one or more memory controller(s) to provide an interface to system memory 506. System memory 506 may be used to load and store data and/or instructions, for example, for VSN 400, VM 410, and/or VM 412. System memory 506 for one embodiment may include any suitable volatile memory, such as suitable dynamic random access memory (DRAM), for example. System memory 506 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 506 may include a storage resource physically part of a device on which VSN 400, VM 410, and/or VM 412 is installed or it may be accessible by, but not necessarily a part of, the device. For example, the memory 504 may be accessed over a network via the network interface 508 and/or over Input/Output (1/0) devices 510. Network interface 508 may have a transceiver 508a to provide a radio interface for VSN 400, VM 410, and/or VM 412 to communicate over one or more network(s) and/or with any other suitable device. Network interface 508 may include any suitable hardware and/or firmware. The network interface 508 may include a plurality of antennas to provide a multiple input, multiple output radio interface. Network interface 508 for one embodiment may include, for example, a wired network adapter, a wireless network adapter, a telephone modem, and/or a wireless modem. For one embodiment, at least one of the processor(s) 502 may be packaged together with logic for one or more controller(s) of system control logic 504. For one embodiment, at least one of the processor(s) 502 may be integrated on the same die with logic for one or more controller(s) of system control logic 504. In various embodiments, the 1/0 devices 510 may include user interfaces designed to enable user interaction with VSN 400, VM 410 and/or VM 412, peripheral component interfaces designed to enable peripheral component interaction with VSN 400, VM 410 and/or VM 412, and/or sensors designed to determine environmental conditions and/or location information related to the network element or system VSN 400, VM 410 and/or VM 412. In various embodiments, the peripheral component interfaces may include, but are not limited to, a non-volatile memory port, a universal serial bus (USB) port, an audio jack, and a power supply interface.

In the foregoing specification, embodiments have been described with reference to specific exemplary embodiments thereof It will be evident that various modifications may be made thereto without departing from the broader spirit and scope of the invention as set forth in the following claims. The specification and drawings are, accordingly, to be regarded in an illustrative sense rather than a restrictive sense.

Further, reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise as apparent from the above discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) non-transitory quantities within the computer system's registers and memories into other data similarly represented as physical quantities within the computer system memories or registers or other such information storage, transmission or display devices.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

In this disclosure, devices or networked elements that are described as in "communication" with each other or "coupled" to each other need not be in continuous communication with each other or in direct physical contact, unless expressly specified otherwise. On the contrary, such elements need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, elements that are in communication with or coupled with each other may communicate directly or indirectly through one or more intermediaries.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

I claim:

1. A network device comprising:
a port for interfacing with mobile radio network control entities to receive signaling messages;
a port for interfacing with at least one core network control node pool;
a processor coupled to said port for interfacing with mobile radio network control entities and said port for interfacing with at least one core network control node pool; and memory coupled to said processor and storing programs to provide ingress functions, egress functions and map functions, wherein the map functions cause the processor to maintain a map associating user equipment devices with a specific node in a core network control node pool, wherein the ingress functions cause the processor to examine received signaling messages for information to determine the appropriate at least one core network control node pool, to maintain such determination in the map, and to forward the received signaling messages to proper egress functions, and wherein the egress functions are provided for each at least one core network control node pool and cause the processor to load balance the nodes in said at least one core network control node pool, to forward received signaling messages to a node in a core network control node pool, and to provide the specific node for the user equipment device to the map.

2. The network device of claim 1, wherein the received signaling messages are Stream Control Transmission Protocol (SCTP) messages.

3. The network device of claim 2, wherein the received signaling messages are further S1-AP messages, and wherein determining the appropriate at least one core network control node pool includes inspecting the S1-AP header.

4. The network device of claim 3, wherein the received signaling messages are further non-access stratum (NAS) messages, and wherein determining the appropriate at least one core network control node pool further includes inspecting the NAS message.

5. The network device of claim 1, wherein the ingress functions and egress functions are instantiated in virtual machines (VMs).

6. The network device of claim 1, wherein the network device has a single Internet Protocol (IP) address or a plurality of multi-homed IP addresses for use by the mobile radio network control entities.

7. The network device of claim 1, wherein the mobile radio network entities are eNodeBs.

8. A network comprising:
a plurality of mobile radio network control entities;
at least one core network control node pool; and
a network device comprising:
   a port for interfacing with said mobile radio network control entities to receive signaling messages;
   a port for interfacing with said at least one core network control node pool;
   processor coupled to said port for interfacing with mobile radio network control entities and said port for interfacing with at least one core network control node pool; and
   memory coupled to said processor and storing programs to provide ingress functions, egress functions and map functions,
wherein the map functions cause the processor to maintain a map associating user equipment devices with a specific node in a core network control node pool,
wherein the ingress functions cause the processor to examine received signaling messages for information to determine the appropriate at least one core network control node pool, to maintain such determination in the map, and to forward the received signaling messages to proper egress functions, and
wherein the egress functions are provided for each at least one core network control node pool and cause the processor to load balance the nodes in said at least one core network control node pool, to forward received signaling messages to a node in a core network control node pool, and to provide the specific node for the user equipment device to the map.

9. The network of claim 8, wherein the received signaling messages are Stream Control Transmission Protocol (SCTP) messages.

10. The network of claim 9, wherein the received signaling messages are further S1-AP messages, and wherein determining the appropriate at least one core network control node pool includes inspecting the S1-AP header.

11. The network of claim 10, wherein the received signaling messages are further non-access stratum (NAS) messages, and wherein determining the appropriate at least one core network control node pool further includes inspecting the NAS message.

12. The network of claim 8, wherein the ingress functions and egress functions are instantiated in virtual machines (VMs).

13. The network of claim 8, wherein said network device has a single Internet Protocol (IP) address or a plurality of multi-homed IP addresses for use by said mobile radio network control entities.

14. The network of claim 8, wherein said mobile radio network entities are eNodeBs.

15. A method comprising:
receiving signaling messages from mobile radio network control entities;
maintaining a map associating user equipment devices with a specific node in a core network control node pool;
examining received signaling messages for information to determine the appropriate at least one core network control node pool, to maintain such determination in the map, and to forward the received signaling messages to proper egress functions;
load balancing the nodes in said at least one core network control node pool;
forwarding received signaling messages to a node in a core network control node pool; and
providing the specific node for the user equipment device to the map.

16. The method of claim 15, wherein the received signaling messages are Stream Control Transmission Protocol (SCTP) messages.

17. The method of claim 16, wherein the received signaling messages are further S1-AP messages, and wherein determining the appropriate at least one core network control node pool includes inspecting the S1-AP header.

18. The method of claim 17, wherein the received signaling messages are further non-access stratum (NAS) messages, and wherein determining the appropriate at least one core network control node pool further includes inspecting the NAS message.

19. The method of claim 15, wherein the received signaling messages are directed to a single Internet Protocol (IP) address or a plurality of multi-homed IP addresses for use by the mobile radio network control entities.

20. The method of claim 15, wherein the mobile radio network entities are eNodeBs.

* * * * *